US012605893B2

(12) United States Patent
Lee et al.

(10) Patent No.: US 12,605,893 B2
(45) Date of Patent: Apr. 21, 2026

(54) PRINTING SYSTEM

(71) Applicants: Hyundai Motor Company, Seoul (KR); Kia Corporation, Seoul (KR); BASE AND POWER CITY Corp., Seoul (KR)

(72) Inventors: Donguk Lee, Seoul (KR); Sungsu Park, Seoul (KR)

(73) Assignees: Hyundai Motor Company, Seoul (KR); Kia Corporation, Seoul (KR); BASE AND POWER CITY CORP, Seoul (KR)

( * ) Notice: Subject to any disclaimer, the term of this patent is extended or adjusted under 35 U.S.C. 154(b) by 70 days.

(21) Appl. No.: 18/620,528

(22) Filed: Mar. 28, 2024

(65) Prior Publication Data

US 2025/0162252 A1 May 22, 2025

(30) Foreign Application Priority Data

Nov. 20, 2023 (KR) ........................ 10-2023-0161396

(51) Int. Cl.
*B29C 64/25* (2017.01)
*B22F 10/00* (2021.01)
(Continued)

(52) U.S. Cl.
CPC .............. *B29C 64/25* (2017.08); *B22F 10/00* (2021.01); *B22F 12/222* (2021.01); *B22F 12/224* (2021.01); *B22F 12/50* (2021.01); *B25J 5/00* (2013.01); *B25J 9/0084* (2013.01);

*B25J 9/026* (2013.01); *B25J 9/1682* (2013.01); *B25J 11/005* (2013.01); *B29C 64/20* (2017.08);
(Continued)

(58) Field of Classification Search
CPC ...................................................... B33Y 30/00
See application file for complete search history.

(56) References Cited

U.S. PATENT DOCUMENTS 10,099,466 B2 * 10/2018 Skogsrud ............... B25J 9/1679
10,620,611 B2 * 4/2020 Meess ..................... B22F 10/66
(Continued)

FOREIGN PATENT DOCUMENTS

CN 109177149 A * 1/2019 ........... B29C 64/268
JP 2017-30093 A 2/2017
(Continued)

*Primary Examiner* — Benjamin A Schiffman
(74) *Attorney, Agent, or Firm* — MORGAN, LEWIS & BOCKIUS LLP

(57) ABSTRACT

A printing system includes a first robot being movable, a second robot located in any one side of the first robot in a leftward and rightward direction and being movable, a connecting portion connecting the first robot and the second robot, a printing portion connected to the connecting portion and that is configured to perform 3D printing, and a supply portion that supplies a material to the printing portion, the printing portion includes a discharge member connected to the supply portion and that discharges the material, an upward and downward movement member that moves the discharge member upward and downward, and a leftward and rightward movement member that moves the upward and downward movement member leftward and rightward, and any one of the first robot and the second robot is coupled to the supply portion.

13 Claims, 6 Drawing Sheets

RIGHT SIDE · REAR SIDE
FRONT SIDE · LEFT SIDE

(51) Int. Cl.

| | |
|---|---|
| *B22F 12/00* | (2021.01) |
| *B22F 12/50* | (2021.01) |
| *B25J 5/00* | (2006.01) |
| *B25J 9/00* | (2006.01) |
| *B25J 9/02* | (2006.01) |
| *B25J 9/16* | (2006.01) |
| *B25J 11/00* | (2006.01) |
| *B29C 64/20* | (2017.01) |
| *B29C 64/205* | (2017.01) |
| *B29C 64/209* | (2017.01) |
| *B29C 64/232* | (2017.01) |
| *B29C 64/236* | (2017.01) |
| *B29C 64/255* | (2017.01) |
| *B29C 64/321* | (2017.01) |
| *B29C 64/379* | (2017.01) |
| *B33Y 30/00* | (2015.01) |
| *B33Y 40/00* | (2020.01) |
| *B62D 57/032* | (2006.01) |
| *B29C 64/106* | (2017.01) |

(52) U.S. Cl.
CPC .......... *B29C 64/205* (2017.08); *B29C 64/209* (2017.08); *B29C 64/232* (2017.08); *B29C 64/236* (2017.08); *B29C 64/255* (2017.08); *B29C 64/321* (2017.08); *B29C 64/379* (2017.08); *B33Y 30/00* (2014.12); *B33Y 40/00* (2014.12); *B62D 57/032* (2013.01); *B29C 64/106* (2017.08)

(56) References Cited

U.S. PATENT DOCUMENTS

| | | | | |
|---|---|---|---|---|
| 10,894,289 B2 * | 1/2021 | Ishida | ..................... | B22F 10/43 |
| 10,994,484 B2 * | 5/2021 | Knox | ................... | B29C 64/329 |
| 11,110,663 B2 * | 9/2021 | Yan | ....................... | B29C 64/118 |
| 11,718,041 B2 * | 8/2023 | Zhou | ..................... | B29C 64/236 |
| | | | | 425/150 |
| 12,024,907 B2 * | 7/2024 | Charmley | .......... | B28B 23/0062 |
| 12,128,584 B2 * | 10/2024 | Na | ......................... | B33Y 30/00 |
| 12,208,579 B2 * | 1/2025 | Zhou | ..................... | H01M 10/46 |
| 12,214,554 B2 * | 2/2025 | Cardon | .................. | B33Y 30/00 |
| 12,286,804 B2 * | 4/2025 | Pettit | ................... | E04G 21/0427 |
| 2017/0144377 A1 * | 5/2017 | Wu | ....................... | B29C 64/106 |
| 2018/0370134 A1 * | 12/2018 | Zhou | ..................... | B33Y 30/00 |
| 2019/0036337 A1 * | 1/2019 | Zhang | .................. | B29C 64/227 |
| 2021/0129440 A1 * | 5/2021 | Schumann | ........... | B29C 64/379 |
| 2025/0171094 A1 * | 5/2025 | Lee | ....................... | B62D 57/02 |

FOREIGN PATENT DOCUMENTS

| | | | | |
|---|---|---|---|---|
| JP | 7054136 B | 4/2022 | | |
| KR | 10-1706473 B | 2/2017 | | |
| KR | 101895151 B1 * | 9/2018 | ............ | B28B 1/001 |
| KR | 10-2020-0101482 A | 8/2020 | | |
| KR | 10-2278253 B | 7/2021 | | |
| KR | 102396630 B1 * | 5/2022 | ............ | B05B 15/25 |
| KR | 10-2023-0022067 A | 2/2023 | | |
| WO | WO 2023-031302 A | 3/2023 | | |

* cited by examiner

RIGHT SIDE

REAR SIDE

FRONT SIDE

LEFT SIDE

RIGHT
SIDE

REAR
SIDE

FRONT
SIDE

LEFT
SIDE

PRINTING SYSTEM

CROSS-REFERENCE TO RELATED APPLICATION

The present application claims priority to Korean Patent Application No. 10-2023-0161396, filed on filed on Nov. 20, 2023, the entire contents of which is incorporated herein for all purposes by this reference.

BACKGROUND OF THE PRESENT DISCLOSURE

Field of the Present Disclosure

The present disclosure relates a printing system.

Description of Related Art 3D printing refers to an activity of converting electronic information for generating a 3D shape into three dimensions through an automated output device. With the development of the 3D printing technology, researches on architectural technologies using the 3D printing technology are currently being actively conducted.

Meanwhile, a conventional 3D printer adopts a fixed method of printing products with a frame fixed to the ground. That is, because a product is printed within a work area of equipment, a 3D printer with a large work area is needed to have a work area which may correspond to a size of a large-sized structure when the structure is produced.

Furthermore, an environment, in which construction is carried out, may be a harsh environment or an environment which is difficult for people to access, such as a narrow space for people to pass through, and in the case of a conventional 3D printer, it is difficult to move the 3D printer into such an environment.

Accordingly, there is a demand for the development of a 3D printer which may be moved into a construction environment and produce products based on such movement while not requiring a large work area.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a printing system which may be applied to various environmental conditions.

An aspect of the present disclosure also provides a printing system configured for producing large structures despite having a relatively small work area.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a printing system includes a first robot being movable, a second robot located in a side of the first robot in a first direction and being movable, a connecting portion connecting the first robot and the second robot, a printing portion connected to the connecting portion and that is configured to perform 3D printing, and a supply portion that supplies a material to the printing portion, the printing portion includes a discharge member connected to the supply portion and that discharges the material, an upward and downward movement member that moves the discharge member in the second direction, and a in the first direction movement member that moves the upward and downward movement member in the first direction, and any one of the first robot and the second robot is coupled to the supply portion.

In another example, the printing system may further include a controller electrically connected to at least one of the first robot, the second robot, the connecting portion, and the printing portion, and that is configured to control an operation of the at least one of the first robot, the second robot, the connecting portion, and the printing portion, wherein another one of the first robot and the second robot is coupled to the controller.

In another example, the supply portion may include a storage member that stores the material, and a hose member connecting the storage member and the discharge member, and the storage member may extrude the material into the hose member and supply the material to the discharge member.

In another example, the storage member may be located on an upper side of any one of the first robot and the second robot, the controller may be located on an upper side of the other one of the first robot and the second robot, and lengths of the storage member and the controller along an second direction may correspond to each other.

In another example, one end portion of the connecting portion may be connected to the controller, and an opposite end portion of the connecting portion may be connected to the storage member.

In another example, the upward and downward movement member may include an upward and downward extension portion connected to the discharge member and extending in the second direction from the discharge member, and an upward and downward movement portion that moves the discharge member in the second direction by moving the upward and downward extension portion, and wherein the upward and downward extension portion is engaged to the upward and downward movement portion by passing through and coupled to the upward and downward movement portion.

In another example, the leftward and rightward movement member may include a leftward and rightward extension portion extending in the first direction and that passes through the upward and downward movement portion in the first direction, and a leftward and rightward movement portion that moves the upward and downward movement portion in the first direction thereof.

In another example, a pair of leftward and rightward extension portions may be provided to be spaced from each other in a third direction, and the upward and downward extension portion may be disposed between the pair of leftward and rightward extension portions.

In another example, the connecting portion may include a first connecting member extending in a second direction from the first robot, a second connecting member extending in a second direction from the second robot, and a third connecting member connecting the first connecting member and the second connecting member.

In another example, the first connecting member and the second connecting member may be configured so that lengths thereof along the upward and downward direction are variable.

In another example, the first connecting member may include a first connecting element extending in the second direction from the first robot, a second connecting element, through which the first connecting element passes in an interior thereof, and an upper side of which is closed, and a first hydraulic pressure supply portion that moves the second connecting element upward by supplying a hydraulic pressure to an interior of the second connecting element.

In another example, a pair of first connecting members, a pair of second connecting members, and a pair of third connecting members may be provided to be spaced from each other in the third direction, respectively, and wherein the printing portion is disposed between the pair of third connecting members.

In another example, the connecting portion may further include a fourth connecting member extending in the third direction and connecting the pair of first connecting members, and a fifth connecting member extending in the third direction and connecting the pair of second connecting members, the upward and downward movement member may include an upward and downward extension portion connected to the discharge member and extending in the second direction from the discharge member, and an upward and downward movement portion passing through the upward and downward extension portion in the upward and downward direction, and that moves the discharge member upward and downward by moving the upward and downward extension portion in the second direction, the leftward and rightward movement member may include a leftward and rightward extension portion extending in the first direction and that passes through the upward and downward movement portion in the first direction, and a leftward and rightward movement portion that moves the upward and downward movement portion in the first direction, and end portions of the pair of leftward and rightward extension portions may contact with the fourth connecting member, and opposite end portions thereof contact with the fifth connecting member.

In another example, the printing system may further include a third robot located on any one of a side of the first robot in the first direction or a side of the second robot in the first direction and being movable, and the connecting portion may further connect the first robot and the third robot, or the second robot and the third robot.

According to another aspect of the present disclosure, a printing system includes a plurality of robots arranged in the first direction, connecting portions connecting, among the plurality of robots, robots disposed adjacent to each other, and printing portions connected to the connecting portions and that is configured to perform 3D printing, and the numbers of the connecting portions and the printing portions may be smaller than the number of the robots by one.

In another example, the printing system may further include a controller electrically connected to at least one of the plurality of robots, the connecting portions, and the printing portions, and that is configured to control an operation of the at least one of the plurality of robots, the connecting portions, and the printing portions, and the controller may perform a control to designate, among the plurality of robots, any one robot as a host and designate the remaining robots as guests so that the remaining robots follow the operation of the any one robot.

In another example, the controller may be accommodated on an upper side of the any one robot.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
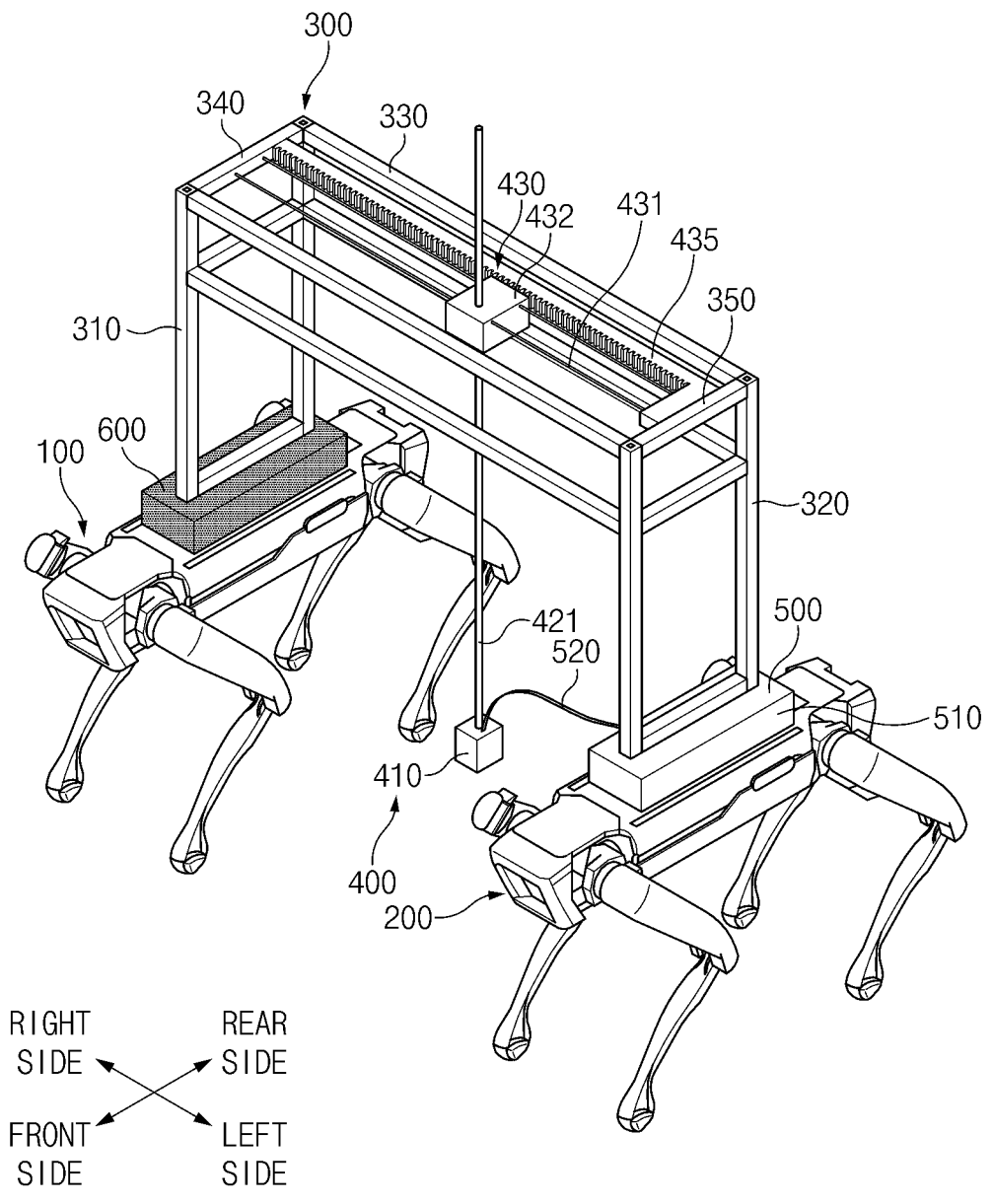
FIG. 1 is a view conceptually illustrating a printing system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the exemplary embodiments of the present disclosure, when it is determined that a detailed description of related known configurations and functions may hinder understanding of the exemplary embodiments of the present disclosure, a detailed description thereof will be omitted.

A printing system according to an exemplary embodiment of the present disclosure may be a printing system for 3D printing. As an exemplary embodiment of the present disclosure, the printing system according to an exemplary embodiment of the present disclosure may be a printing system for 3D printing that produces structures for use at construction sites.

In the specification, a forward/rearward direction, a leftward and rightward direction, and a vertical direction are referred to for convenience of description, and may be directions that are perpendicular to each other. However, the directions are determined relative to a direction, in which the printing system is arranged, and the upward and downward direction may not necessarily mean the vertical direction.

Figure 2:
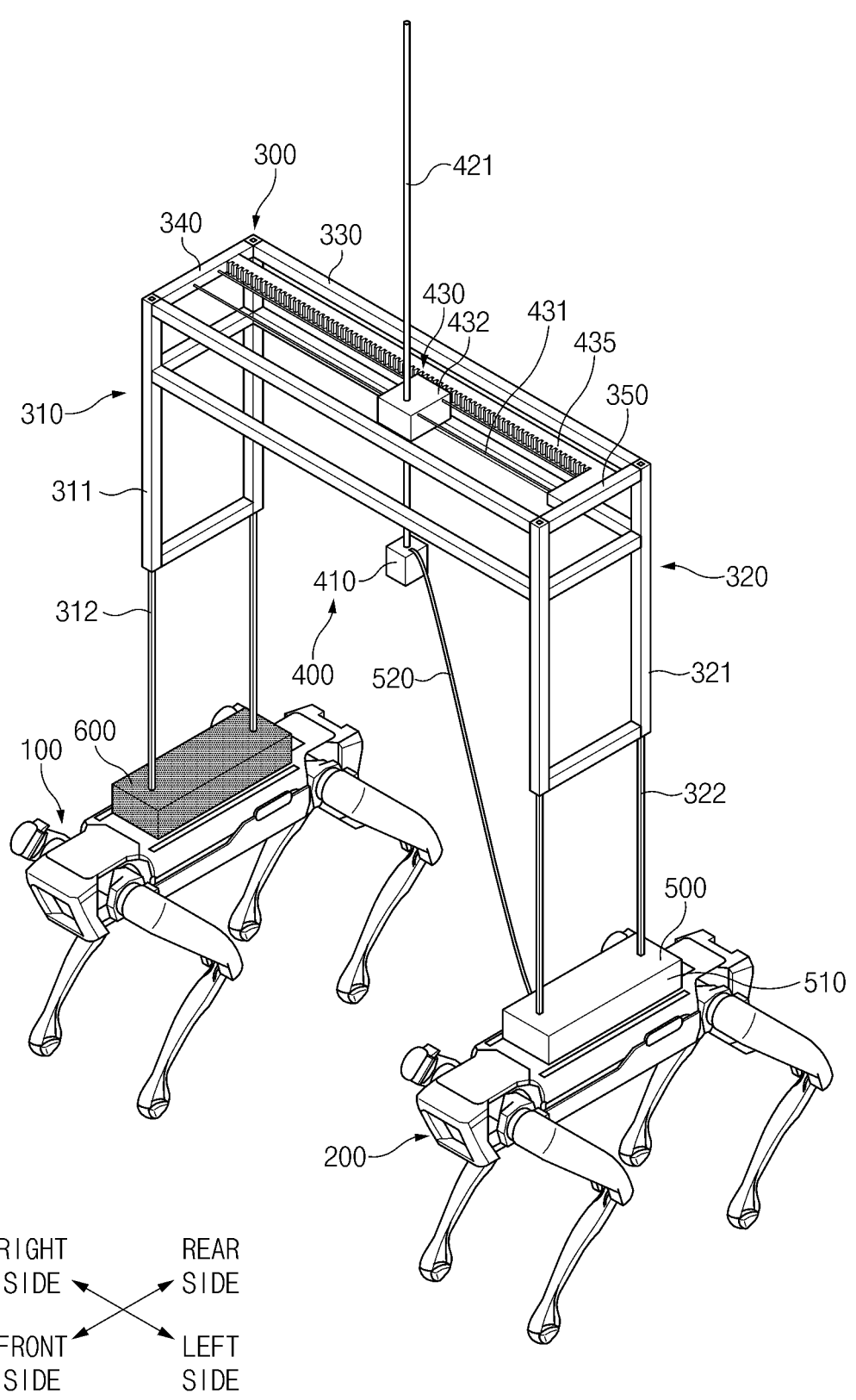
FIG. 2 is a view exemplarily illustrating a state, in which a discharge member is lifted in FIG. 1.

FIG. 1 is a view conceptually illustrating a printing system according to an exemplary embodiment of the present disclosure. FIG. 2 is a view exemplarily illustrating a state, in which a discharge member is lifted in FIG. 1.

The printing system according to an exemplary embodiment of the present disclosure may include a first robot 100, a second robot 200, a connecting portion 300, a printing portion 400, and a supply portion 500. The first robot 100 may be a mobile robot. As an exemplary embodiment of the present disclosure, the first robot 100 may be a robot configured for walking on four legs. The second robot 200 may be located in any one of leftward and rightward directions of the first robot 100. The second robot 200 may be a mobile robot. As an exemplary embodiment of the present disclosure, the second robot 200 may be a robot configured for walking on four legs. The first robot 100 and the second robot 200 may be robots of the same type.

The connecting portion 300 may be a portion that connects the first robot 100 and the second robot 200. As the connecting portion 300 connects the first robot 100 and the second robot 200, a resistance to an impact applied in the leftward and rightward direction may become stronger as compared with when an operation of the first robot 100 or the second robot 200 is performed alone. As an exemplary embodiment of the present disclosure, the connecting portion 300 may have a "n" shape when viewed from a front side thereof.

The printing portion 400 may be connected to the connecting portion 300, and may perform 3D printing. The supply portion 500 may be configured to supply a material to the printing portion 400. Accordingly, the material may be cement, but is not limited thereto, and various materials, such as plastic and metal, may be used. Meanwhile, any one of the first robot 100 and the second robot 200 may be coupled to the supply portion 500.

Figure 3:
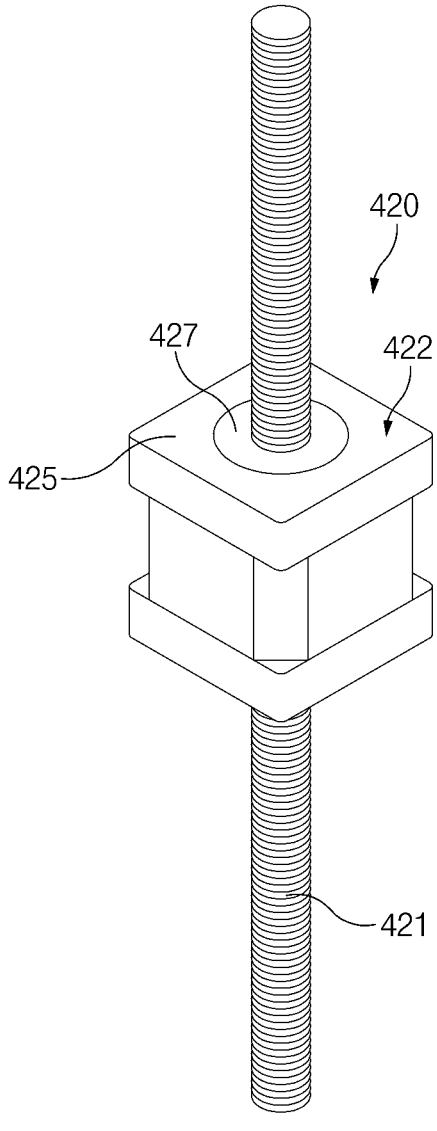
FIG. 3 is a view conceptually illustrating an upward and downward movement member.
Figure 4:
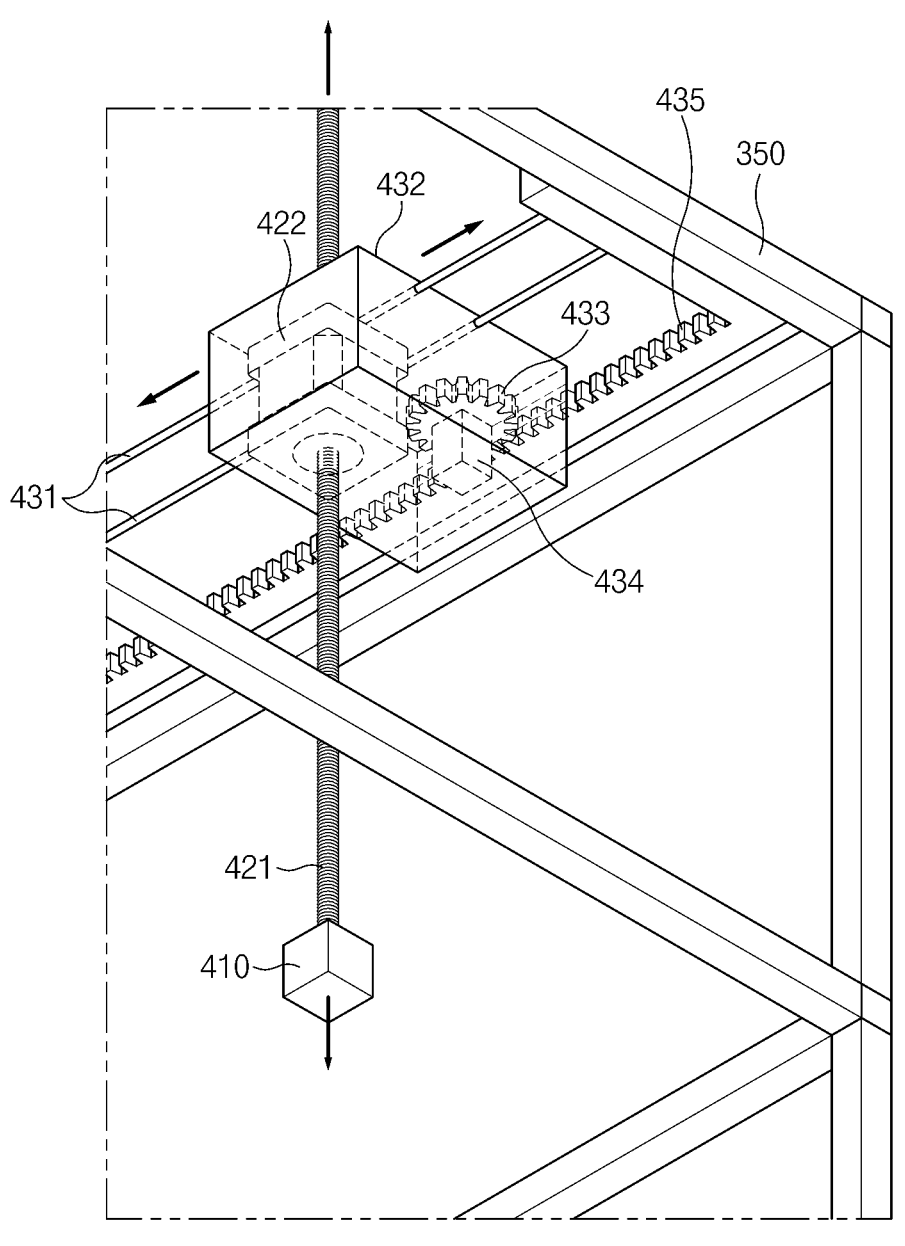
FIG. 4 is a conceptually enlarged view of a leftward and rightward movement member.
Figure 4:
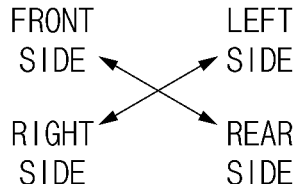
Figure 5:
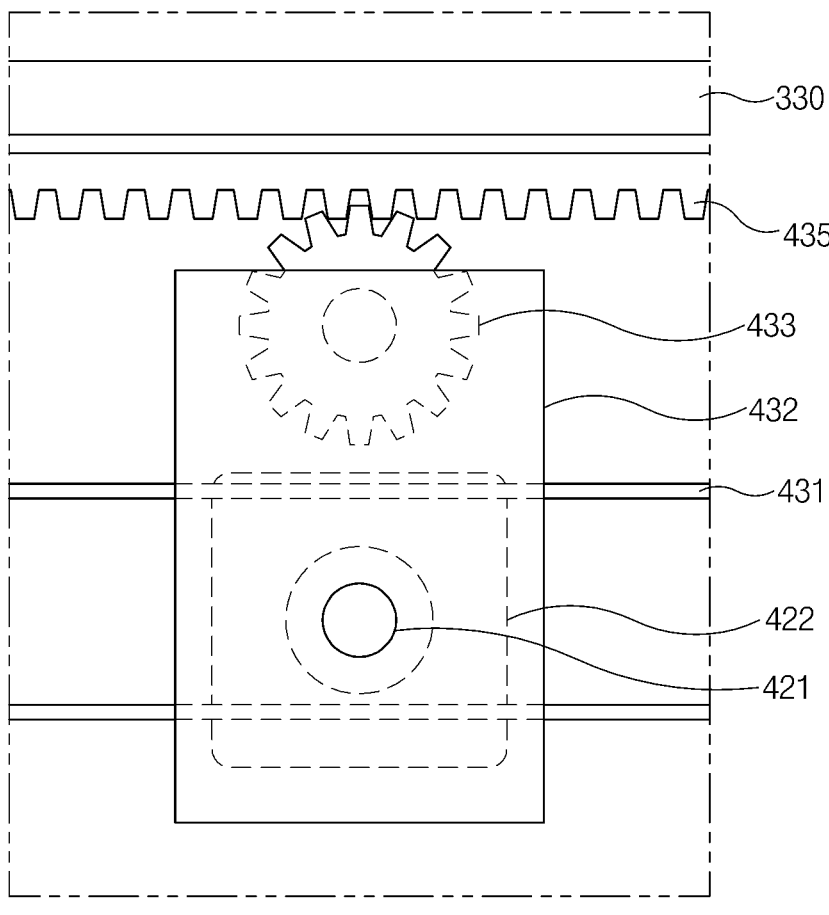
FIG. 5 is a view conceptually illustrating a leftward and rightward movement member, viewed from a top.

FIG. 3 is a view conceptually illustrating an upward and downward movement member. FIG. 4 is a view conceptually illustrating a leftward and rightward movement member. FIG. 5 is a view conceptually illustrating the leftward and rightward movement member, viewed from a top.

The printing portion 400 may include a discharge member 410, an upward and downward movement member 420, and a leftward and rightward movement member 430. The discharge member 410 may be a member which is connected to the supply portion 500 and is configured to discharge a material. The upward and downward movement member 420 may be a member which is configured to move the discharge member 410 upward and downward. The leftward and rightward movement member 430 may be a member which is configured to move the upward and downward movement member 420 leftward and rightward.

The printing system according to an exemplary embodiment of the present disclosure may further include a controller 600. The controller 600 may be electrically connected to at least one of the first robot 100, the second robot 200, the connecting portion 300, and the printing portion 400, and may be configured for controlling an operation of the at least one of the first robot 100, the second robot 200, the connecting portion 300, and the printing portion 400.

The controller 600 may include a processor and memory. The processor may include a microprocessor, such as a field programmable gate array (FPGA), an application specific integrated circuit (ASIC), or a central processing unit (CPU). The memory may store control instructions that are the basis for generating commands for controlling the operation of at least one of the first robot 100, the second robot 200, the connecting portion 300, and the printing portion 400 in the processor. The memory may be a data storage, such as a Hard Disk Drive (HDD), a solid state drive (SSD), a volatile medium, or a non-volatile medium.

The other one of the first robot 100 and the second robot 200 may be coupled to the controller 600. For example, when the controller 600 is coupled to the first robot 100, the supply portion 500 may be coupled to the second robot 200, and when the controller 600 is coupled to the second robot 200, the supply portion 500 may be coupled to the first robot 100.

According to an exemplary embodiment of the present disclosure, because printing is performed through a structure, in which the first robot 100 and the second robot 200 are coupled to the printing portion 400, printing may be performed in various environmental conditions that are difficult for humans to enter. Furthermore, because the first robot 100 and the second robot 200 may be moved, even movement areas of the robots may become work areas, and thus, a large structure may be produced despite having a relatively small work area. Hereinafter, the components will be described in more detail.

Supply Portion 500

The supply portion 500 may include a storage member 510 and a hose member 520. The storage member 510 may be configured to store a material in an internal thereof. The hose member 520 may be a member that connects the storage member 510 and the discharge member 410. The storage member 510 may supply the material to the discharge member 410 by an actuator operatively connected to the controller 600 for extruding the material to an interior of the hose member 520. For example, the actuator may be any one of an electric actuator, a hydraulic actuator, or a pneumatic actuator.

The storage member 510 may be located on an upper side of any one of the first robot 100 and the second robot 200. Accordingly, the controller 600 may be located on an upper side of the other one of the first robot 100 and the second robot 200. Lengths of the storage member 510 and the controller 600 along the upward and downward direction may correspond to each other.

Printing Portion 400

The upward and downward movement member 420 may include an upward and downward extension portion 421 and an upward and downward movement portion 422. The upward and downward extension portion 421 may be connected to the discharge member 410, and may extend upwards from the discharge member 410. The upward and downward movement portion 422 may be configured to move the discharge member 410 upward and downward by moving the upward and downward extension portion 421 upward and downward. Because the printing system according to an exemplary embodiment of the present disclosure may move the discharge member 410 upward and downward, it may print a structure that extends upward and downward. Furthermore, because the printing system itself may be moved forward and rearward thereof, the structure that extend forward and rearward may also be printed.

As an exemplary embodiment of the present disclosure, the upward and downward extension portion 421 may pass through the upward and downward movement portion 422. However, of course, various forms of modification are possible as long as the upward and downward movement portion 422 may move the upward and downward extension portion 421 upward and downward.

For example, a screw thread may be formed on an external peripheral surface of the upward and downward extension portion 421, and the upward and downward movement portion 422 including an actuator operatively connected to the controller 600 may rotate the upward and downward extension portion 421 by operating the actuator of upward and downward movement portion 422 to move the upward and downward extension portion 421 upward and downward. The actuator of upward and downward movement portion 422 may include a motor 425 which is engaged with an external peripheral surface of the upward and downward extension portion 421 and includes a rotatable portion 427 disposed in an interior of the upward and downward movement portion 422 and engaged to the screw thread formed on the external peripheral surface of the upward and downward extension portion 421. Accordingly, when the motor rotates, the rotatable portion rotates by the motor and thus the external peripheral surface of the upward and downward extension portion 421 may move in the upward and downward direction.

The leftward and rightward movement member 430 may include a leftward and rightward extension portion 431 and a leftward and rightward movement portion 432. The leftward and rightward extension portion 431 may extend in the leftward and rightward direction, and may be configured to pass through the upward and downward movement portion 422 in the leftward and rightward direction thereof. The leftward and rightward movement portion 432 may be configured to move the upward and downward movement portion 422 in the leftward and rightward direction thereof.

As an exemplary embodiment of the present disclosure, the leftward and rightward movement portion 432 may include an actuator such as a pinion 433 and a pinion motor 434 that is operatively connected to the controller 600 and rotates the pinion 433. The pinion 433 may be engaged with a rack 435 which is coupled to the connecting part 300. When viewed along the upward and downward direction, a portion of the pinion 433 may protrude from the leftward and rightward movement portion 432. As the pinion 433 is rotated by the pinion motor 434, the upward and downward movement portion 422 may be moved in the leftward and rightward direction thereof.

The upward and downward movement portion 422 may be disposed in an interior of the leftward and rightward movement portion 432. Accordingly, as the leftward and rightward movement portion 432 is moved in the leftward and rightward direction, the upward and downward movement portion 422 may be moved in the leftward and rightward direction thereof.

A pair of leftward and rightward extension portions 431 are provided, and may be spaced from each other in the forward/rearward direction thereof. The upward and downward extension portion 421 may be disposed between the pair of leftward and rightward extension portions 431.

Connecting Portion 300

One end portion of the connecting portion 300 may be connected to the controller 600, and an opposite end portion of the connecting portion 300 may be connected to the storage member 510. Accordingly, one end portion of the connecting portion 300 may be any one of lower end portions of the connecting portion 300, and the opposite end portion of the connecting portion 300 may be another one of the lower end portions of the connecting portion 300.

The connecting portion 300 may include a first connecting member 310, a second connecting member 320, and a third connecting member 330. The first connecting member 310 may extend upwards from the first robot 100. The second connecting member 320 may extend upwards from the second robot 200. The third connecting member 330 may connect the first connecting member 310 and the second connecting member 320.

The first connecting member 310 and the second connecting member 320 may be configured so that lengths thereof along the upward and downward direction may be variable. As the lengths of the first connecting member 310 and the second connecting member 320 along the vertical direction may be changed, a range, in which the printing portion 400 may be moved along the upward and downward direction, may be further increased.

As an exemplary embodiment of the present disclosure, the first connecting member 310 may include a first connecting element 311 and a second connecting element 312. The first connecting element 311 may extend upwards from the first robot 100. The second connecting element 312 may be a portion, through which the first connecting element 311 may pass through, and an upper side of which is closed.

As a component for moving the second connecting element 312 upward, the first connecting member 310 may include a first hydraulic pressure supply portion. The first hydraulic pressure supply portion may move the second connecting element 312 upward by supplying a hydraulic pressure to an interior of the second connecting element 312.

The second connecting member 320 may include a (2-1)-th connecting portion 321 and a (2-2)-th connecting portion 322. The (2-1)-th connecting portion 321 may extend upwards from the second robot 200. The (2-2)-th connecting portion 322 may be a portion, through which the (2-1)-th connecting portion 321 may pass, and an upper side of which is closed.

As a component for moving the (2-2)-th connecting portion 322 upward, the second connecting member 320 may include a second hydraulic pressure supply portion. The second hydraulic pressure supply portion may move the (2-2)-th connecting portion 322 upward by supplying a hydraulic pressure to an interior of the (2-2)-th connecting portion 322.

In an exemplary embodiment of the present disclosure, the first hydraulic pressure supply portion and the second hydraulic pressure supply portion are operatively connected to the controller 600 so as to control the hydraulic pressure to an interior of the second connecting element 312 and the hydraulic pressure to an interior of the (2-2)-th connecting portion 322.

A pair of first connecting members 310, a pair of second connecting members 320, and a pair of third connecting members 330 may be provided to be spaced from each other forward and rearward thereof, respectively. The printing portion 400 may be disposed between the pair of third connecting members 330.

The connecting portion 300 may further include a fourth connecting member 340 and a fifth connecting member 350. The fourth connecting member 340 may extend forward and rearward thereof, and may connect the pair of first connecting members 310. The fifth connecting member 350 may extend forward and rearward thereof, and may connect the pair of second connecting members 320.

Ends of the pair of leftward and rightward extension portions 431 may contact with the fourth connecting member 340, and opposite end portions thereof may be contact with the fifth connecting member 350.

Figure 6:
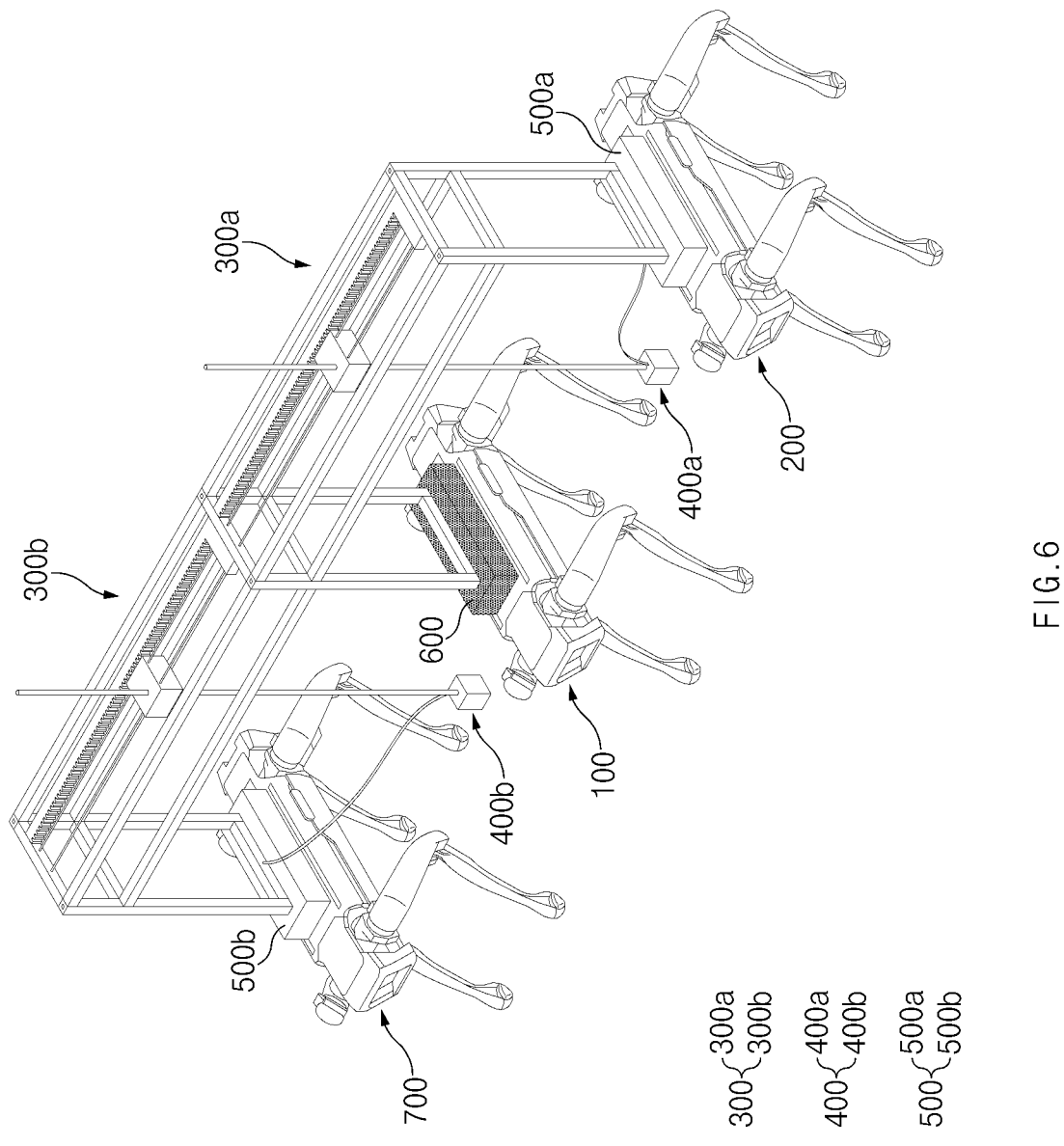
FIG. 6 is a view conceptually illustrating a printing system including first, second, and third robots.

FIG. 6 is a view conceptually illustrating a printing system including first, second, and third robots. As illustrated in FIG. 6, the printing system according to an exemplary embodiment of the present disclosure may include not only two robots but also more robots.

Hereinafter, a case of having two or more robots will be described in detail. The drawing illustrates a case of having three robots, but it may also be possible to have more robots as needed. For components that are the same or equivalent to those described above, the same or equivalent reference numerals are assigned, and a detailed description thereof will be omitted.

The printing system according to an exemplary embodiment of the present disclosure may include a plurality of robots that are arranged leftward and rightward. As an exemplary embodiment of the present disclosure, the printing system may include a first robot 100, a second robot 200, and a third robot 700. The third robot may be located in any another one of the leftward and rightward directions of the first robot or any another one of the leftward and rightward directions of the second robot.

Hereinafter, as illustrated in the drawings, a case, in which an arrangement order is from the left side to the third robot 700, the first robot 100, and the second robot 200, will be described in detail.

The connecting portion 300 may connect, among the plurality of robots, robots that are disposed to be adjacent to each other. That is, the connecting portion may be configured to further connect the first robot and the third robot or the second robot and the third robot.

As an exemplary embodiment of the present disclosure, the connecting portion 300 may include a first connecting portion 300a and a second connecting portion 300b. The first connecting portion 300a may connect the first robot 100 and the second robot 200. The second connecting portion 300b may connect the first robot 100 and the third robot 700. The first connecting portion 300a and the second connecting portion 300b may have shapes that correspond to each other.

The printing portion 400 may be connected to the connecting portion 300, and may perform 3D printing. As an exemplary embodiment of the present disclosure, the printing portion 400 may include a first printing portion 400a and a second printing portion 400b. The first printing portion 400a may be connected to the first connecting portion 300a. The second printing portion 400b may be connected to the second connecting portion 300b. The first printing portion 400a and the second printing portion 400b may have shapes that correspond to each other.

The supply portion 500 may include a first supply portion 500a and a second supply portion 500b. The first supply portion 500a may be configured to supply the material to the first printing portion 400a. The second supply portion 500b may be configured to supply the material to the second printing portion 400b. The first supply portion 500a may be accommodated on an upper side of the second robot 200, and the second supply portion 500b may be accommodated on an upper side of the third robot 700. The first supply portion 500a and the second supply portion 500b may have shapes that correspond to each other.

As discussed, the numbers of the connecting portions 300 and the printing portions 400 may be smaller than the number of robots by one.

The controller 600 may designate any one of the plurality of robots as a host and designate the remaining robots as guests. The controller 600 may perform a control so that the remaining robots follow an operation of the any one robot. As an exemplary embodiment of the present disclosure, one robot may be a robot, on which the controller 600 is accommodated.

As an exemplary embodiment of the present disclosure, the controller 600 may be accommodated on the first robot 100. Accordingly, the controller 600 may designate the first robot 100 as the host and designate the second robot 200 and the third robot 700 as the guests. The controller 600 may perform a control so that the second robot 200 and the third robot 700 follow an operation of the first robot. As an exemplary embodiment of the present disclosure, when the first robot 100 is moved forward, the second robot 200 and the third robot 700 may be moved forward thereof.

The controller 600 may perform a control so that the remaining connecting portions follow an operation of any one connecting portion. As an exemplary embodiment of the present disclosure, the controller may perform a control so that the second connecting portion 300b follows an operation of the first connecting portion 300a.

The controller 600 may perform a control so that the remaining printing portions follow an operation of any one printing portion. As an exemplary embodiment of the present disclosure, the controller may perform a control so that the second printing portion 400b follows an operation of the first printing portion 400a.

The controller 600 may perform a control so that the remaining supply portions follow an operation of any one supply portion. As an exemplary embodiment of the present disclosure, the controller may perform a control so that the second supply portion 500b follows an operation of the first supply portion 500a.

Because the controller 600 is configured to perform a control so that the remaining robots follow an operation of the any one robot, a control efficiency increases and a stable control is possible compared to the case, in which the controller 600 is configured to control all operations of the robots.

According to an exemplary embodiment of the present disclosure, because printing is performed through a structure, in which a printing portion is coupled to a movable robot, it may be applied to various environmental conditions, and large structures may be produced despite having a relatively small work area.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, portions, or combinations thereof described in the specification are present, and does not preclude the possibility of addition or presence of one or more other features, numbers, steps, operations, elements, portions, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A printing system comprising:
a first robot being movable;
a second robot located in a side of the first robot in a first direction and being movable;
a connecting portion connecting the first robot and the second robot;
a printing portion connected to the connecting portion and configured to perform 3D printing;
a supply portion configured to supply a material to the printing portion; and
a controller electrically connected to at least one of the first robot, the second robot, the connecting portion, and the printing portion, and configured to control an operation of the at least one of the first robot, the second robot, the connecting portion, and the printing portion, wherein the printing portion includes:

12 a discharge member connected to the supply portion and configured to discharge the material;
an upward and downward movement member configured to move the discharge member in a second direction; and
a leftward and rightward movement member engaged to the upward and downward movement member and configured to move the upward and downward movement member in the first direction,
wherein the supply portion includes a storage member configured to store the material, and
wherein the storage member located on an upper side of any one of the first robot and the second robot is coupled to the supply portion,
wherein the controller is located on an upper side of another one of the first robot and the second robot,
wherein lengths of the storage member and the controller along the second direction correspond to each other, and
wherein one end portion of the connecting portion is connected to the controller, and an opposite end portion of the connecting portion is connected to the storage member.

2. The printing system of claim 1,
wherein the supply portion operatively connected to the controller further includes:
a hose member connecting the storage member and the discharge member, and
wherein the storage member extrudes the material into the hose member and supplies the material to the discharge member.

3. The printing system of claim 1, wherein the upward and downward movement member includes:
an upward and downward extension portion connected to the discharge member and extending in the second direction from the discharge member; and
an upward and downward movement portion engaged to the upward and downward extension portion and configured to move the discharge member in the second direction by moving the upward and downward extension portion, and
wherein the upward and downward extension portion is engaged to the upward and downward movement portion by passing through and coupled to the upward and downward movement portion.

4. The printing system of claim 3, wherein the leftward and rightward movement member includes:
a leftward and rightward extension portion extending in the first direction and configured to pass through the upward and downward movement portion in the first direction and be engaged thereto; and
a leftward and rightward movement portion configured to move the upward and downward movement portion in the first direction.

5. The printing system of claim 4,
wherein a pair of leftward and rightward extension portions are provided to be spaced from each other in a third direction, and
wherein the upward and downward extension portion is disposed between the pair of leftward and rightward extension portions.

6. The printing system of claim 4, wherein the leftward and rightward movement portion includes:
a pinion;
a pinion motor connected to the pinion and operatively connected to a controller to rotate the pinion; and a rack coupled to the connecting part and engaged to the pinion.

7. The printing system of claim 3, wherein a screw thread is formed on an external peripheral surface of the upward and downward extension portion, and a rotatable portion is disposed in an interior of the upward and downward movement portion and engaged to the screw thread, and wherein an actuator operatively connected to a controller is coupled to the rotatable portion to move the upward and downward extension portion in the second direction.

8. The printing system of claim 1, wherein the connecting portion includes:

a first connecting member extending in the second direction from the first robot;

a second connecting member extending in the second direction from the second robot; and a third connecting member connecting the first connecting member and the second connecting member.

9. The printing system of claim 8, wherein the first connecting member and the second connecting member are configured so that lengths of the first connecting member and the second connecting member along the second direction are variable.

10. The printing system of claim 9, wherein at least one of the first connecting member and the second connecting member includes:

a first connecting element extending in the second direction from the first robot;

a second connecting element, through which the first connecting element passes in an internal of the second connecting element, and an upper side of which is closed; and a first hydraulic pressure supply portion configured to move the second connecting element in the second direction by supplying a hydraulic pressure to an interior of the second connecting element.

11. The printing system of claim 8, wherein a pair of first connecting members, a pair of second connecting members, and a pair of third connecting members are provided to be spaced from each other in a third direction, respectively, and wherein the printing portion is disposed between the pair of third connecting members.

12. The printing system of claim 11, wherein the connecting portion further includes:

a fourth connecting member extending in the third direction and connecting the pair of first connecting members; and a fifth connecting member extending in the third direction and connecting the pair of second connecting members, wherein the upward and downward movement member includes:

an upward and downward extension portion connected to the discharge member and extending in the second direction from the discharge member; and an upward and downward movement portion passing through the upward and downward extension portion in the second direction, and configured to move the discharge member in the second direction by moving the upward and downward extension portion in the second direction, wherein the leftward and rightward movement member includes:

a leftward and rightward extension portion extending in the first direction and passing through the upward and downward movement portion in the first direction and engaged thereto; and a leftward and rightward movement portion engaged to the upward and downward movement portion and configured to move the upward and downward movement portion in the first direction, and wherein end portions of the pair of leftward and rightward extension portions contact with the fourth connecting member, and opposite end portions of the pair of leftward and rightward extension portions contact with the fifth connecting member.

13. The printing system of claim 1, further including:

a third robot located on any one of a side of the first robot in the first direction or a side of the second robot in the first direction and being movable, wherein the connecting portion further connects the first robot and the third robot, or the second robot and the third robot.

* * * * *